(12) United States Patent
Yang et al.

(10) Patent No.: US 9,817,198 B2
(45) Date of Patent: Nov. 14, 2017

(54) OPTICAL MODULE

(71) Applicants: Hisense Broadband Multimedia Technologies Co., Ltd., Qingdao, Shangdong Province (CN); Hisense Broadband Multimedia Technologies, Ltd., Tortola (VG)

(72) Inventors: Shiquan Yang, Qingdao (CN); Xianpeng Du, Qingdao (CN); Hao Wang, Qingdao (CN); Hongwei Mu, Qingdao (CN); Fang Liu, Qingdao (CN)

(73) Assignees: Hisense Broadband Multimedia Technologies Co., Ltd., Qingdao, Shandong (CN); Hisense Broadband Multimedia Technologies, Ltd., Tortola (VG)

( * ) Notice: Subject to any disclaimer, the term of this patent is extended or adjusted under 35 U.S.C. 154(b) by 0 days.

(21) Appl. No.: 15/064,144

(22) Filed: Mar. 8, 2016

(65) Prior Publication Data

US 2017/0059794 A1  Mar. 2, 2017

(30) Foreign Application Priority Data

Aug. 24, 2015 (CN) .......................... 2015 1 0523633

(51) Int. Cl.
*G02B 6/32* (2006.01)
*G02B 7/02* (2006.01)
*G02B 6/42* (2006.01)
*G02B 6/43* (2006.01)

(52) U.S. Cl.
CPC ......... *G02B 6/4239* (2013.01); *G02B 6/4204* (2013.01); *G02B 6/43* (2013.01); *G02B 7/025* (2013.01); *G02B 6/4244* (2013.01)

(58) Field of Classification Search
CPC ...................................................... G02B 7/021
See application file for complete search history.

(56) References Cited

U.S. PATENT DOCUMENTS

| 5,793,540 A * | 8/1998 | Ohtsuki ................. G02B 7/023 359/811 |
| 6,490,303 B1 * | 12/2002 | Komiyama ......... H01S 5/02216 359/819 |
| 7,787,004 B2 * | 8/2010 | Nomura ..................... B41J 2/45 347/238 |
| 8,609,445 B2 * | 12/2013 | Kanemoto ........... G02B 6/4201 359/344 |
| 9,122,025 B2 * | 9/2015 | Ishikawa .............. G02B 6/4292 |
| 2003/0021311 A1 * | 1/2003 | Tsunetomo ......... H01S 5/02284 372/36 |

(Continued)

FOREIGN PATENT DOCUMENTS

KR 2008090673 A * 10/2008 ............... G02B 6/10

*Primary Examiner* — Michelle R Connelly
(74) *Attorney, Agent, or Firm* — Brinks Gilson & Lione (57) ABSTRACT

The present disclosure provides an optical module. The optical module of the present disclosure may include: a base, the base being provided with a fixing part configured to place a lens; the lens located in the fixing part; and a laser, located on the base, the laser being configured to transmit an optical signal to the lens, where fixing adhesive is filled symmetrically in gaps between two symmetric sides of the lens and the fixing part.

18 Claims, 7 Drawing Sheets

(56) References Cited

U.S. PATENT DOCUMENTS

| | | | |
|---|---|---|---|
| 2004/0247240 A1* | 12/2004 | Teramura | G02B 6/4226 385/27 |
| 2004/0264538 A1* | 12/2004 | Namiwaka | H01S 5/02284 372/50.1 |
| 2008/0189726 A1* | 8/2008 | Kinoshita | G11B 7/1378 720/681 |
| 2013/0011104 A1* | 1/2013 | Sato | G02B 6/4244 385/93 |
| 2015/0338602 A1* | 11/2015 | Furutake | G02B 7/021 359/793 |

* cited by examiner

OPTICAL MODULE

PRIORITY STATEMENT

This application claims priority benefit of Chinese Patent Application No. 201510523633.5 filed on Aug. 24, 2015, in the State Intellectual Property Office of the People's Republic of China, the disclosures of which is incorporated herein in its entirety by reference.

TECHNICAL FIELD

The present disclosure relates to the field of optical communication technologies, and in particular, to an optical module.

BACKGROUND

In an application of the optical fiber communication technology, an electrical signal needs to be converted into an optical signal by using a transmitter optical device (for example, a laser), and the optical signal is then coupled to an optical fiber for transmission. In an actual application, the optical signal is generally coupled to the optical fiber by using a lens. When coupling is performed by using the lens, the fixing of the lens needs to be implemented online during the coupling, and the fixing may be implemented by adhering with adhesive.

SUMMARY

According to an aspect of the present disclosure, an optical module may comprise a base including a fixing part, wherein the fixing part includes a first wall and a second wall parallel to the first wall; a lens in the fixing part between the first wall and the second wall, forming a first gap between the lens and the first fall and a second gap between the lens and the second wall; a laser on the base facing towards the lens and configured to emit optical signal into the lens; and a first fixing adhesive filled in the first gap and a second fixing adhesive filled in the second gap.

According to another aspect of the present disclosure, an optical module may comprise a base including a fixing part, wherein the fixing part includes a first wall and a second wall parallel to the first wall; a lens in the fixing part between the first wall and the second wall, forming a first gap between the lens and the first fall and a second gap between the lens and the second wall; a detector located on the base to receive an optical signal transmitted by the lens; and a first fixing adhesive filled in the first gap and a second fixing adhesive filled in the second gap.

BRIEF DESCRIPTION OF THE DRAWINGS

To describe the technical solutions in the embodiments of the present disclosure or in the conventional art more clearly, accompanying drawings required to be used in descriptions of the embodiments or the conventional art are introduced briefly. Apparently, the accompanying drawings in the following descriptions are some embodiments of the present disclosure, and for persons of ordinary skill in the art, other accompanying drawings may further be derived according to the accompanying drawings without any creative effort.

FIG. 5b is a schematic partial structural front view of FIG. 5a;

DETAILED DESCRIPTION

In order to make objectives, technical solutions and advantages of the embodiments of the present disclosure clearer, the technical solutions in the embodiment of the present disclosure are described clearly and completely through the accompanying drawings in the embodiments of the present disclosure. Apparently, the described embodiments are a part of embodiments of the present disclosure, instead of all embodiments. Based on the embodiments in the present disclosure, all other embodiments obtained by persons of ordinary skill without any creative effort shall fall within the protection scope of the present disclosure.

Figure 1:
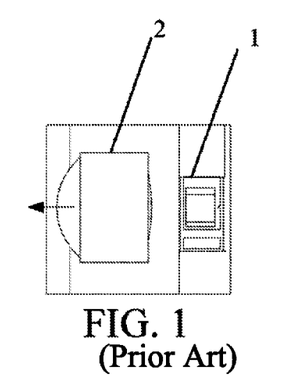
FIG. 1 is a schematic structural diagram of a conventional transmitter optical subassembly.
Figure 2:
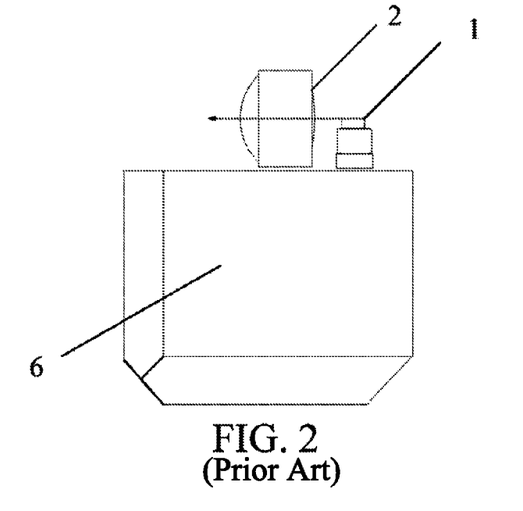
FIG. 2 is a schematic side view of the structure shown in FIG. 1.
Figure 3:
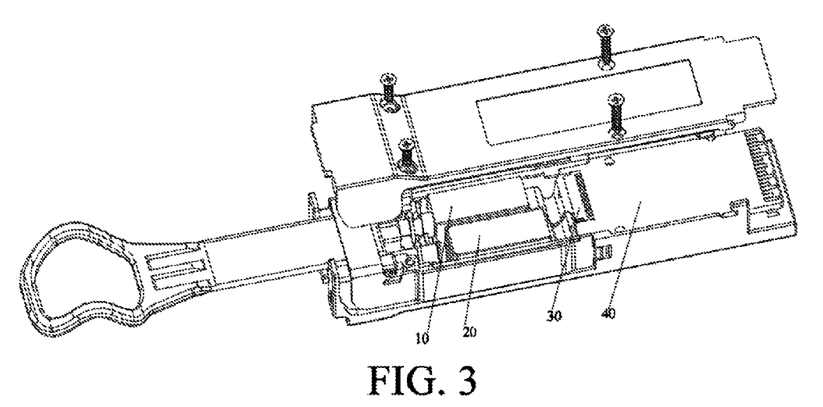
FIG. 3 is a schematic structural diagram of an optical module.

FIG. 3 is a schematic structural diagram of an optical module. As shown in FIG. 3, the optical module may include: a transmitter optical subassembly (TOSA) 10, a Receiver Optical Subassembly (ROSA) 20, a Flexible Printed Circuit (FPC) 30 and a Printed circuit board (PCB) 40. FIG. 1 shows an internal structure of the TOSA in the optical module. The embodiment of the present disclosure is described by using a lens fixing manner in the TOSA shown in FIG. 1 as an example, and a lens fixing manner in the ROSA is similar to that. As shown in FIG. 1, light emitted by a laser 1 is coupled to an optical fiber through a lens 2; the diameter of a light beam at the focal point of the lens 2 is generally 6 μm, the diameter of the optical fiber is generally 8 μm, and therefore, the position of the lens is crucial, the allowed positional deviation is merely 1 μm to 2 μm, and once the positional deviation is large, the optical cannot be completely coupled to the optical fiber, thereby generating coupling loss. The lens is generally fixed by adhesive. The position of the lens is determined by performing active coupling on a coupling seat. After an optimal position is determined by active coupling, gaps between the lens and the base are filled by the adhesive, and then the adhesive is cured. FIG. 2 is a schematic side view of the structure shown in FIG. 1, and as shown in FIG. 2, in this case, the adhesive merely exits between the bottom surface of the lens 2 and the base 6. During solidification, the fixing adhesive may shrink or expand, generating a force to the bottom surface of the lens attached to the fixing adhesive, so as to drive the lens attached to the fixing adhesive to move, and therefore, the position of the lens changes along with the shrinkage or expansion of the fixing adhesive due to the solidification.

Figure 4:
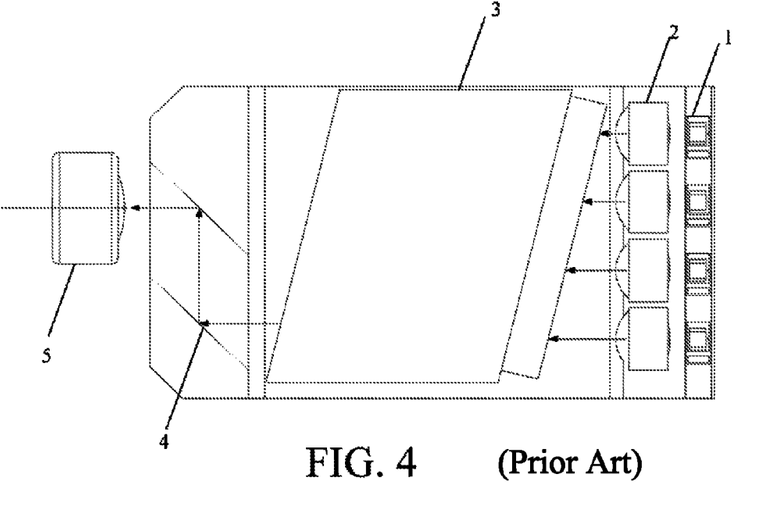
FIG. 4 is a schematic structural diagram of a conventional four-path combining TOSA.

FIG. 4 is a schematic structural diagram of a conventional four-path combining TOSA. The four-path combining TOSA may include a plurality of lasers 1, each emitting a light beam. The light beam emitted by each of the lasers 1 passes through a corresponding first lens 2 to form collimated light beams. FIG. 4 shows only 4 beams. each of the four collimated light beams has a different wavelength. The four beams of collimated light are combined into one beam of light by a combiner 3, the light beam is biased to an appropriate position by using a prism 4, and the light beam is converged to an optical fiber by using a second lens 5. In this combination optical path, the diameter of a light spot formed by the first lens 2 is generally 6 μm, if the first lens 2 has positional derivation, the positional derivation of the light spot may be greater after passing through intermediate devices such as the combiner 3, the prism 4 and the second lens 5, the diameter of the optical fiber is generally 8 μm, and therefore, the position of the first lens is crucial, once the positional derivation is large, the optical signal cannot be completely coupled to the optical fiber, thereby generating coupling loss. The fixing of the first lens is the same as the fixing manner of the structure in FIG. 1.

The present disclosure provides systems and methods that eliminate the above problems in the lens fixing manner in the TOSA or ROSA.

The optical module in the embodiments of the present disclosure may include all optical modules that need to fix a lens or another optical device with adhesive, the embodiments of the present disclosure are not limited thereto, and the following embodiments are described by using lens fixing in a TOSA as an example.

The technical solutions of the present disclosure are described in the following. The following embodiments may make a cross-reference, and the same or similar concepts or processes may not be repeated in some embodiments.

Figure 5A:
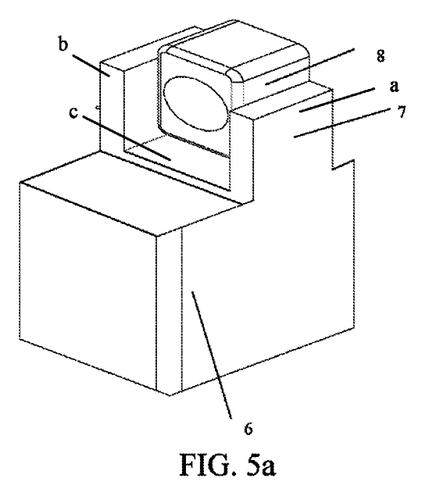
FIG. 5a is a first three-dimensional schematic internal structural diagram of an optical module according to the present disclosure.
Figure 5B:
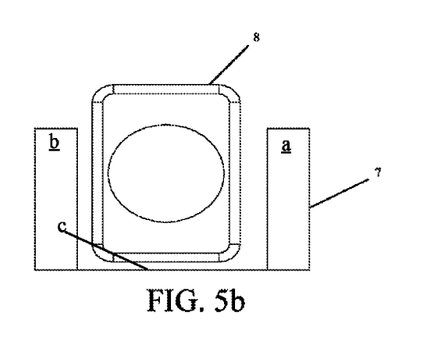
Figure 5C:
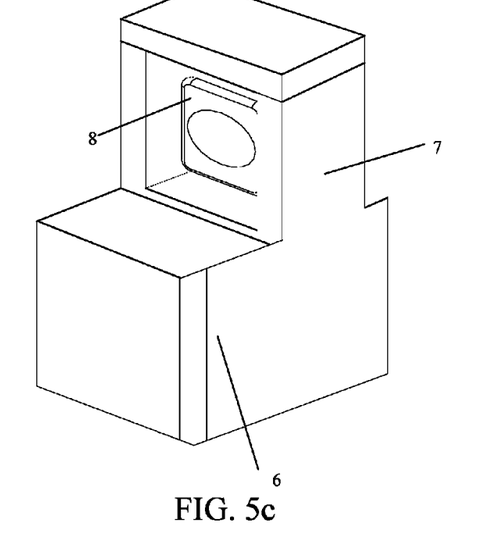
FIG. 5c is a second three-dimensional schematic internal structural diagram of an optical module according to the present disclosure.
Figure 5D:
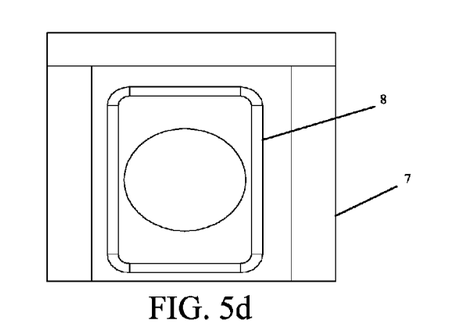
FIG. 5d is a schematic partial structural front view of FIG. 5c.

FIG. 5a is a first three-dimensional schematic internal structural diagram of an optical module according to the present disclosure. FIG. 5b is a schematic partial structural front view of FIG. 5a. FIG. 5c is a second three-dimensional schematic internal structural diagram of an optical module according to the present disclosure. FIG. 5d is a schematic partial structural front view of FIG. 5c.

As shown in FIG. 5a and FIG. 5c, the optical module of this embodiment may include: a base 6, the base 6 being provided with a fixing part 7 configured to place a lens 8. For example, the fixing part may include two parallel walls a, b sitting on and perpendicular to a bottom surface c. the optical module may also include the lens 8, located in the fixing part 7 between the walls a, b and the surface c; and a laser 1, located on the base 6, the laser 1 being configured to transmit an optical signal to the lens 8.

In the optical module fixing adhesive is filled symmetrically in gaps between two symmetric sides of the lens 8 and the fixing part 7.

In the embodiment of the present disclosure, the fixing part may be a U-shaped slot or a square frame.

To avoid the position change of the lens due to the shrinkage or expansion of the fixing adhesive as shown in the structure of FIG. 2, the embodiment of FIG. 5a may adopt a lens fixing structure, the lens is fixed in the lens fixing structure, and the lens fixing structure may be the fixing part 7 located on the base 6, where, the material of the fixing part is not limited, and it may be formed by a metallic or non-metallic structure member.

As shown in FIG. 5a and FIG. 5b, the fixing part 7 is slightly larger than the lens, and the lens is allowed to have some room to move to find the optimal position during active coupling. Therefore, gaps exist between the lens 8 and the bottom surface and two vertical side surfaces of the fixing part 7. During filling, the fixing adhesive may be filled in a symmetric manner, that is, the fixing adhesive may be filled symmetrically in the gaps between two sides, left and right sides, of the lens and the two vertical side surfaces of the fixing part 7.

The fixing adhesive should select one whose coefficient of expansion matches with the coefficients of expansion of the material of the fixing part and the material of the lens, that is, differences between the coefficients of expansion of the fixing adhesive, the material of the fixing part and the material of the lens are less than a preset threshold.

As shown in FIG. 5c and FIG. 5d, gaps exist between the lens 8 and the top surface, the bottom surface and the two vertical side surfaces of the fixing part 7, and the gaps may be filled by the fixing adhesive.

When the fixing adhesive is filled into the gaps, the fixing adhesive is filled symmetrically in the gaps between the lens 8 and the fixing part 7. The adhesive may be symmetrically dispensed in the gaps at two sides, left and right sides, of the lens 8, the adhesive may be symmetrically dispensed in the gaps at two sides, upper and lower sides, of the lens 8, and the adhesive may also be symmetrically dispensed in the gaps at four sides, left and right sides and upper and lower sides, of the lens 8.

In an actual application, it is generally needed to dispense the adhesive in advance in the gap between the bottom surface of the fixing part and the lens, so as to pre-fix the lens; or, the adhesive is dispensed in advance in the gap between the top surface of the fixing part and the lens, so as to pre-fix the lens. A small amount of adhesive may be filled between the bottom surface or the top surface of the fixing part and the lens, and the adhesive may be filled symmetrically between the lens and the two symmetric side surfaces of the fixing part. Moreover, by means of stronger fixing manner at the left and right sides (more fixing adhesive may be filled at the left and right sides), when the fixing adhesive filled between the two side surfaces of the fixing part and the lens shrinks or expands due to solidification of the fixing adhesive, directions of forces by which the fixing adhesive at the symmetric positions drive the lens to move are opposite to each other and are cancelled out, so that the influence of the non-symmetric fixing at the bottom is reduced, thereby reducing the moving degree of the lens.

Before the fixing adhesive is filled, the gaps between the two sides of the fixing part 7 and the lens may generally be 0.05 mm, and the gap between the bottom surface of the fixing part 7 and the lens may generally be 0.1 mm, so that the lens has some room to move to find the optimal position during active coupling. After the lens is fixed with the fixing adhesive, the gap between the lens and the bottom surface of the fixing part is in a range of 0.05 mm-0.15 mm; and the gaps between the lens and the two side surfaces of the fixing part are respectively in a range of 0.025 mm-0.075 mm.

The laser may be welded to the base directly or through a heat sink.

In an actual application, the base may be a metal substrate, which does not need any optical characteristic, and is merely configured to place the laser and the lens.

In fact, the optical module of this embodiment may include a TOSA, and the TOSA may include the base 6, the fixing part 7, the lens 8 and the laser 1.

Figure 6A:
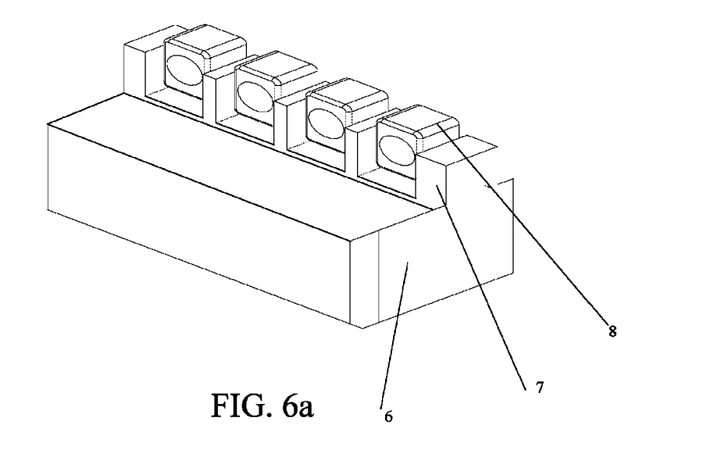
FIG. 6a is a third three-dimensional schematic internal structural diagram of an optical module according to the present disclosure.
Figure 6B:
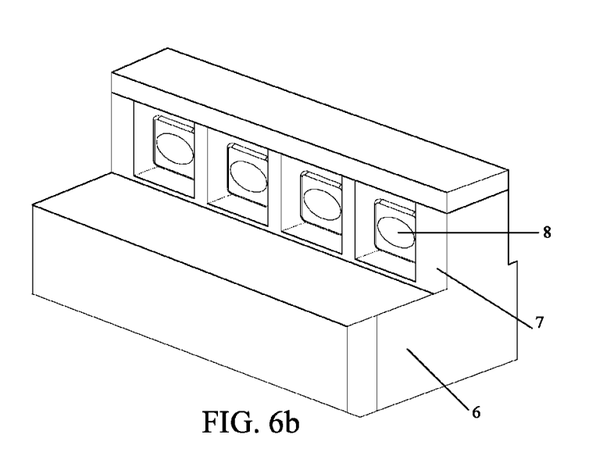
FIG. 6b is a fourth three-dimensional schematic internal structural diagram of an optical module according to the present disclosure.

FIG. 6*a* is a third three-dimensional schematic internal structural diagram of an optical module according to the present disclosure. FIG. 6*b* is a fourth three-dimensional schematic internal structural diagram of an optical module according to the present disclosure. FIG. 6*a* and FIG. 6*b* illustrate an example of an optical module including a four-path combining TOSA. The four-path combining TOSA includes four lenses, the four lenses are fixed on the same base respectively by using a fixing part. To simplify the structure, two adjacent fixing parts may share a vertical side wall. It should be noted that, in an optical module of another type, when there is only one lens, the lens is located in an independent fixing part, and when there are two or more lenses, according to the structure, as shown in FIG. 6*a* and FIG. 6*b*, fixing parts of the two lenses may be configured to share a side wall, and the two fixing parts may be formed integrally.

A surface of the base may serve as a bottom plate of the fixing part. For example, the fixing part may be two columns located on the base form a U-shaped slot with the base, and this manner can prevent the lens position from being too high after the lens is fixed in the U-shaped slot; or the U-shaped slot may be a structure independent to the base, and the U-shaped slot may be fixed to the base by laser welding or by using another structural member. Alternatively, the fixing part may be a inverted U-shaped slot is located on the base to form a square frame; or the square frame may be a structure independent to the base, and the square frame may be fixed to the base by laser welding or by using another structural member. In the above structures, the fixing part and the base may be formed integrally, or may be formed separately and then connected together.

In the optical module provided in this embodiment, the fixing part is located on the base to limit the position of the lens, the lens is fixed in/on the fixing part, so that the fixing adhesive is filled in the gaps between the two symmetric sides of the lens and the fixing part for adhering, that is, the lens is fixed by using the fixing adhesive symmetrically. The adhesive is deployed at two symmetric sides of the lens in a symmetric manner, when the fixing adhesive shrinks or expands due to solidification, directions of forces by which the fixing adhesive at the symmetric positions drive the lens to move are opposite to each other and are cancelled out, thereby reducing the moving degree and/or motion of the lens. Compared with the manner of filling the fixing adhesive merely between the lens and the base in the conventional art, the positional derivation of the lens attached to the adhesive is reduced, thereby preventing the reduction of the coupling efficiency due to moving of the lens.

In another embodiment of an optical module of the present disclosure, the optical module may include: a base, the base being provided with a fixing part configured to place a lens; the lens, located in the fixing part; and a detector, located on the base, the detector being configured to receive an optical signal transmitted by the lens.

The fixing adhesive is filled symmetrically in gaps between two symmetric sides of the lens and the fixing part.

The optical module of this embodiment may include an ROSA, and the ROSA may include: the base, the base being provided with the fixing part configured to place the lens; the lens, located in the fixing part; and the detector, located on the base. Except for the detector, other parts of the ROSA are similar to the principle of the embodiment shown in FIG. 5*a*, which are not repeated herein.

The detector may be located on the base by a heat sink, and the detector may be adhered to a surface of the heat sink facing the lens.

In the optical module provided in this embodiment, the fixing part is located on the base to limit the position of the lens, the lens is fixed in the fixing part, so that the fixing adhesive is filled in the gaps between the two symmetric sides of the lens and the fixing part for adhering, that is, the lens is fixed by using the fixing adhesive symmetrically. The adhesive is deployed at two symmetric sides of the lens in a symmetric manner, when the fixing adhesive shrinks or expands due to solidification, directions of forces by which the fixing adhesive at the symmetric positions drive the lens to move are opposite to each other and are cancelled out, thereby reducing the moving degree of the lens. Compared with the manner of filling the fixing adhesive merely between the lens and the base in the conventional art, the positional derivation of the lens attached to the adhesive is reduced, thereby preventing the reduction of the coupling efficiency due to moving of the lens.

The lens fixing manner of the optical module in the present disclosure is briefly described in the foregoing, and in order that persons skilled in the art can further understand the technical solution of the present disclosure, an application of an optical device included therein is described, and the embodiment of the present disclosure is described merely by the optical module including a four-path combining TOSA as an example. FIG. 6*a* and FIG. 6*b* merely show a part of the first lens, that is, the part of the lens forming collimated light, and for other parts, please refer to the structure of the conventional four-path combining TOSA shown in FIG. 4.

The working principle of the four-path combining TOSA included in the optical module of the present disclosure is described as follows:

Light emitted by each laser passes through the first lens to form collimated light, and four beams of collimated light have different wavelengths. The four beams of collimated light are combined into one beam of light by a combiner, the light beam is biased to an appropriate position by a prism, and the light beam is converged into an optical fiber by a second lens. An arrow direction in the drawing indicates a propagation direction of the light beam. In this combination optical path, the position of the first lens is crucial, and the allowed positional derivation is merely 1 μm to 2 μm. As shown in FIG. 2, the conventional manner of fixing the lens is filling the fixing adhesive between the bottom surface of the first lens 2 and the base 6, and when the fixing adhesive shrinks or expands due to solidification, a force is applied to the bottom surface of the lens attached to the fixing adhesive, so as to drive the lens attached to the fixing adhesive to move, and therefore, the position of the lens changes along with the shrinkage or expansion of the fixing adhesive due to solidification. However, in the present disclosure, the first lens is fixed by using the lens fixing structure of the present disclosure. The position of the first lens is determined by performing active coupling on a coupling seat. After the first lens is placed on the fixing part and the optimal position is determined by active coupling, the fixing adhesive is filled symmetrically in the gaps between the first lens and the fixing part on the base, and the fixing adhesive is then cured.

After the optimal position of the lens is determined by active coupling and the fixing adhesive is filled, when the fixing adhesive shrinks or expands due to solidification, directions of forces by which the fixing adhesive at the symmetric positions drive the lens to move are opposite to each other and are cancelled out, thereby reducing the moving degree of the lens. Therefore, this fixing part structure can better stabilize the position of the first lens, and will not greatly affect the coupling efficiency.

The fixing adhesive may adopt Ultraviolet Rays (UV) adhesive, structural adhesive, or the like, which is not limited in the present disclosure.

In the optical module provided in this embodiment, the fixing part is located on the base to limit the position of the lens, the lens is fixed in the fixing part, so that the fixing adhesive is filled in the gaps between the two symmetric sides of the lens and the fixing part for adhering, that is, the lens is fixed by using the fixing adhesive symmetrically. The adhesive is deployed at two symmetric sides of the lens in a symmetric manner, when the fixing adhesive shrinks or expands due to solidification, directions of forces by which the fixing adhesive at the symmetric positions drive the lens to move are opposite to each other and are cancelled out, thereby reducing the moving degree of the lens. Compared with the manner of filling the fixing adhesive merely between the lens and the base in the conventional art, the positional derivation of the lens attached to the adhesive is reduced, thereby preventing the reduction of the coupling efficiency due to moving of the lens.

Figure 5E:
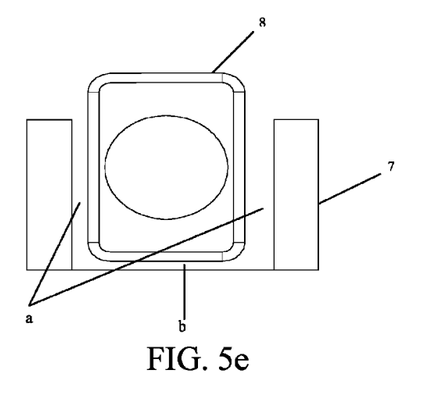
FIG. 5e is a schematic partial structural front view of another embodiment of an optical module according to the disclosure.

FIG. 5e is a schematic partial structural front view of another embodiment of an optical module according to the disclosure. On the basis of the implementation manner shown in FIG. 5b, further, in an actual application, the adhesive is dispensed in advance in the gap between the bottom surface of the fixing part and the lens, so as to pre-fix the lens, and therefore, the adhesive dispensing manner may be that: the fixing adhesive is symmetrically filled in the gaps between the two symmetric side surfaces of the fixing part 7 and the lens 8 (the position shown by a in the drawing), and the fixing adhesive is filled in the gap between the bottom surface of the fixing part 7 and the lens 8 (the position shown by b in the drawing).

Further, in an actual application, in order that forces are more uniformly applied when the lens is fixed and that the stress released when the fixing adhesive filled symmetrically on the side surfaces shrinks or expands due to solidification generates a major influence on the moving of the lens if the adhesive is dispensed in advance between the lens and the bottom surface of the fixing part, in this embodiment, the area of the fixing adhesive filled between the side surfaces of the fixing part and the lens is greater than the area of the fixing adhesive filled between the bottom surface of the fixing part and the lens.

When the fixing adhesive is filled between the lens and the fixing part, the fixing adhesive needs to be dispensed in the gap between the lens and the bottom surface of the fixing part to perform pre-fixing, and therefore, in this embodiment, by adjusting the size of the side wall of the fixing part and controlling the quantity of the filled fixing adhesive, the area of the fixing adhesive filled between the side surfaces of the fixing part and the lens may be made to be greater than the area of the fixing adhesive filled between the bottom surface of the fixing part and the lens. In this way, the fixing adhesive filled between the lens and the side surfaces of the fixing part generates major influences on the moving of the lens when the fixing adhesive shrinks or expands due to solidification, and directions of forces by which the fixing adhesive at the symmetric positions of the two side surfaces drive the lens to move are opposite to each other and are cancelled out, thereby reducing the moving degree of the lens.

In the actual application, for dispensing the adhesive in advance in the gap between the lens and the top surface of the fixing part, the fixing adhesive may be filled in a manner the same as that in the above method, that is, the area of the fixing adhesive filled between the side surfaces of the fixing part and the lens is greater than the fixing adhesive filled between the top surface of the fixing part and the lens.

On the basis of the above embodiment, further, to reduce as much as possible the influence generated by the shrinkage or expansion of the fixing adhesive due to solidification on the position of the lens, when the fixing adhesive filled between the lens and the fixing part is selected, the following manner may be adopted:

The strength of the fixing adhesive filled between the lens and the side surfaces of the fixing part is greater than the strength of the fixing adhesive filled between the lens and the bottom surface of the fixing part.

By means of the fixing adhesive selected in the above manner, the strength of the fixing adhesive filled between the lens and the side surfaces of the fixing part is greater than the strength of the fixing adhesive filled between the lens and the bottom surface of the fixing part, and therefore, when the fixing adhesive shrinks or expands due to solidification, a force applied by the fixing adhesive filled between the lens and the side surfaces of the fixing part to drive the lens to move is greater, and a force applied by the fixing adhesive filled between the lens and the bottom surface of the fixing part to drive the lens to move is smaller. Directions of forces by which the fixing adhesive at the symmetric positions between the lens and the two side surfaces of the fixing part drive the lens to move are opposite to each other and are cancelled out, and the force applied by the fixing adhesive filled between the lens and the bottom surface of the fixing part to drive the lens to move is small; therefore, the position of the lens is basically not changed, and the stability of the lens position is good.

In addition, there are multiple types of fixing adhesive. Two types of fixing adhesive are selected, the fixing adhesive having the large strength is filled between the lens and the side surfaces of the fixing part, and the fixing adhesive having the small strength is filled between the lens and the bottom surface of the fixing part. In actual applications, there are various options. As an implementable manner, the fixing adhesive filled between the lens and the side surfaces of the fixing part is structural adhesive, and the fixing adhesive filled between the lens and the bottom of the fixing part is UV adhesive.

In another embodiment of the present disclosure, fixing adhesive having the same strength may be filled between the lens and the side surfaces of the fixing part and between the lens and the bottom surface of the fixing part, for example, structural adhesive having large strength is filled, which is not limited in the present disclosure.

The UV adhesive refers to a type of adhesive that can be cured only by being irradiated by ultraviolet rays.

The structural adhesive refers to adhesive that has high strength (the compression strength>65 MPa, and the shear strength>18 MPa), can bear a large load, is aging resistant, fatigue resistant and corrosion resistant, has a stable performance during the expected service life, and is applicable to adhering structural members bearing strong forces.

The strength of the structural adhesive is greater than the strength of the UV adhesive.

In this embodiment, the area of the fixing adhesive filled between the side surfaces of the fixing part and the lens is greater than the area of the fixing adhesive filled between the bottom surface of the fixing part and the lens, and when the fixing adhesive filled between the lens and the fixing part is selected, the strength of the fixing adhesive filled between the lens and the side surfaces of the fixing part is greater than the strength of the fixing adhesive filled between the lens and the bottom surface of the fixing part, and therefore, the fixing adhesive filled between the lens and the side surfaces of the fixing part generates the major influence on the moving of the lens when the fixing adhesive shrinks or expands due to solidification; moreover, directions of forces by which the fixing adhesive at the symmetric positions of the two side surfaces drive the lens to move are opposite to each other and are cancelled out, thereby reducing the moving degree of the lens; therefore, the position of the lens is basically not changed, and the stability of the lens position is good.

In another embodiment of an optical module of the present disclosure, on the basis of the above implementation manner, further, in an actual application, there may be various implementation manners of the U-shaped slot, and optionally, as an implementable manner, the U-shaped slot is formed by two columns located on the base and the base.

Further, in order that the directions of forces by which the fixing adhesive at the symmetric positions drive the lens to move are opposite to each other and are cancelled out when the fixing adhesive filled between two side surfaces of the U-shaped slot and the lens shrinks or expands during fixing of the lens, thereby reducing the moving degree of the lens, in the actual application, as an implementable manner, the structures of the two columns may have the same size, and be symmetrically located along a central line of the bottom surface of the U-shaped slot.

The structures of the two columns may have the same size, and therefore, when the fixing adhesive filled symmetrically between the two side surfaces of the U-shaped slot and the lens shrinks or expands due to solidification of the fixing adhesive, the directions of forces by which the fixing adhesive at the symmetric positions drive the lens to move are opposite to each other and are cancelled out, thereby reducing the moving degree of the lens; therefore, the position of the lens is basically not changed. Therefore, the U-shaped slot structure can better stabilize the position of the lens, and will not greatly affect the coupling efficiency.

Figure 7A:
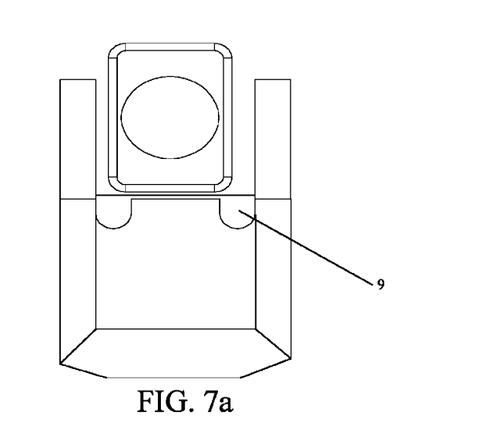
FIG. 7a is a first schematic partial structural diagram of still another embodiment of an optical module according to the disclosure.
Figure 7B:
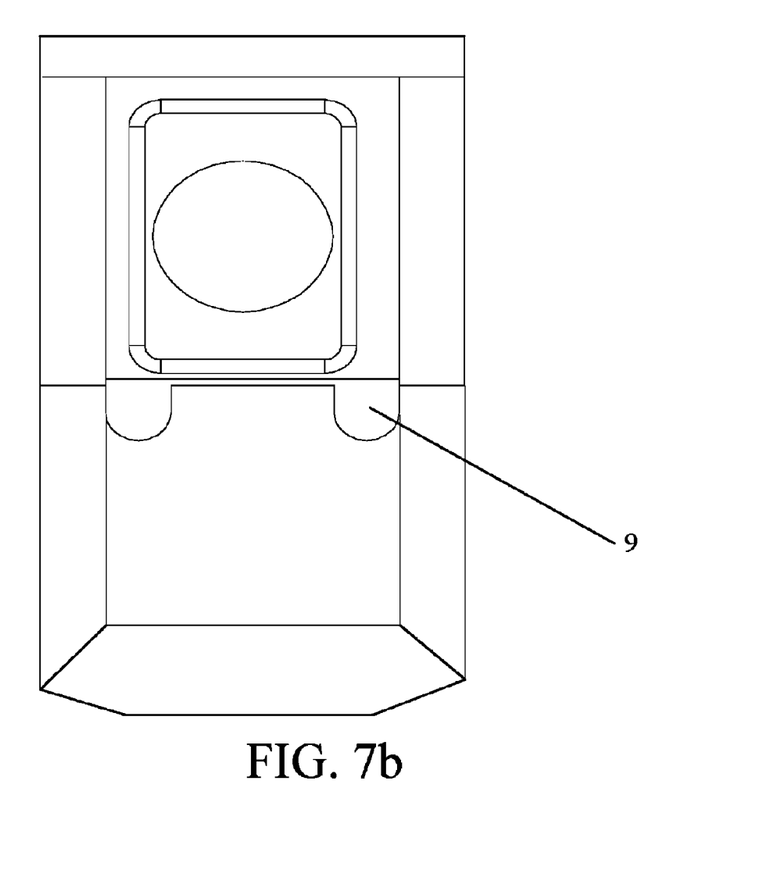
FIG. 7b is a second schematic partial structural diagram of still another embodiment of an optical module according to the disclosure.

FIG. 7a is a first schematic partial structural diagram of still another embodiment of an optical module according to the disclosure. FIG. 7b is a second schematic partial structural diagram of still another embodiment of an optical module according to the disclosure. On the basis of the above embodiments, further, when the fixing adhesive is filled in the gaps between the lens and the fixing part, the fixing adhesive is liquid before being cured, and in order to prevent redundant fixing adhesive from overflowing to the front surface and the rear surface of the lens to affect the optical path, as shown in FIG. 7a and FIG. 7b, a groove 9 is located on the bottom surface of the fixing part, so as to collect redundant filled fixing adhesive.

Two small grooves may be symmetrically located on the bottom surface of the fixing part, which can allow redundant fixing adhesive to overflow, and in this way, redundant fixing adhesive will not overflow to the front surface and the rear surface of the lens to affect the optical path.

On the basis of the above embodiments, further, in an actual application, as an implementable manner, the coefficient of expansion of the fixing part matches with the coefficient of expansion of the lens.

Optionally, the coefficient of expansion of the fixing adhesive matches with the coefficient of expansion of the fixing part and the coefficient of expansion of the lens.

The coefficient of expansion is a physical quantity that represents a thermal expansion property of an object. When the temperature increases by 1° C., a ratio of the increased volume to the original volume or a ratio of the increased length to the original length is referred to as the coefficient of expansion.

The coefficient of expansion of the fixing part matches with the coefficient of expansion of the lens, that is, a difference between the coefficients of expansion of the material of the fixing part and the material of the lens is less than a preset threshold, and the preset threshold may be set to be very small, so as to ensure that a deformation difference generated during thermal expansion of the fixing part and the lens is small, and therefore, the stability of the position of the lens is good.

The coefficient of expansion of the fixing adhesive matches with the coefficient of expansion of the fixing part and the coefficient of expansion of the lens, that is, differences between the coefficients of expansion of the fixing adhesive, the material of the fixing part and the material of the lens are less than a preset threshold, so as to ensure that deformation differences generated during thermal expansion of the fixing adhesive, the fixing part and the lens are small, and therefore, the stability of the position of the lens is good.

In the above implementation manner, the coefficient of expansion of the fixing adhesive matches with the coefficient of expansion of the fixing part and the coefficient of expansion of the lens, and therefore, during thermal expansion, the generated deformation differences are small, and the stability of the position of the lens is good.

The lens fixing structure of the present disclosure may be applicable to any optical module that needs to fix a lens with adhesive, for example, the optical module including an n-path combining TOSA, n 2.

In the embodiment of the present disclosure, the n-path combining TOSA may include: a laser, at least two first lenses, fixing parts having the number the same as that of the first lenses, a combiner, a prism, a second lens, and a base.

The laser, the fixing parts, the combiner and the prism are sequentially fixed on the base along a light propagation direction; and lens fixing structures are sequentially located along a direction perpendicular to the light propagation direction.

The laser is configured to emit laser light.

The first lenses are respectively placed in the fixing parts, and are each configured to form the laser light emitted by the laser into collimated light.

The combiner is configured to combine the collimated light formed by the first lenses into a beam of light.

The prism is configured to bias the light beam emitted by the combiner to a preset position.

The second lens is fixed on a tube shell, and is configured to converge the biased light beam into an optical fiber.

Finally, it should be noted that, the embodiments are merely used to describe the technical solutions of the present disclosure, and are not intended to limit the present disclosure. Although the present disclosure is described in detail with reference to the foregoing embodiments, persons of ordinary skill in the art should know that modifications can still be made to the technical solutions recorded in the foregoing embodiments, or equivalent replacements may be made to a part of or all technical features thereof; however, these modifications or replacements are not intended to make the essences of the corresponding technical solutions depart from the scope of the technical solutions of the embodiments of the present disclosure.

The invention claimed is:

1. An optical module, comprising:
   a base including a fixing part, wherein the fixing part includes:
      a first wall;
      a second wall parallel to the first wall; and
      a bottom surface perpendicular to the first wall and the second wall;
   a lens positioned between the first wall and the second wall included in the fixing part, wherein a first gap is formed between the lens and the first wall, a second gap is formed between the lens and the second wall, and a third gap is formed between the lens and the bottom surface;
   a laser on the base facing towards the lens and configured to emit an optical signal into the lens;
   a first fixing adhesive filled in the first gap and a second fixing adhesive filled in the second gap; and
   a third fixing adhesive filled in the third gap.

2. The optical module according to claim 1, wherein the fixing part comprises a U-shaped slot.

3. The optical module according to claim 1, wherein the fixing part comprises a square frame.

4. The optical module according to claim 1, wherein, an area of the first fixing adhesive is greater than an area of the third fixing adhesive.

5. The optical module according to claim 1, wherein strength of the first fixing adhesive is greater than strength of the third fixing adhesive.

6. The optical module according to claim 1, wherein, the bottom surface of the fixing part further comprises a groove configured to collect redundant of the third filled fixing adhesive.

7. The optical module according to claim 1, wherein, the first fixing adhesive and the second fixing adhesive are structural adhesive, and the third fixing adhesive is ultraviolet rays (UV) adhesive.

8. The optical module according to claim 1, wherein, a coefficient of expansion of the first fixing adhesive matches with a coefficient of expansion of the fixing part and a coefficient of expansion of the lens; and a coefficient of expansion of the second fixing adhesive matches with a coefficient of expansion of the fixing part and a coefficient of expansion of the lens.

9. The optical module according to claim 1, wherein, the third gap is in a range of 0.05 mm-0.15 mm; and the first gap and the second gap are respectively in a range of 0.025 mm-0.075 mm.

10. An optical module, comprising:
    a base including a fixing part, wherein the fixing part includes:
       a first wall;
       a second wall parallel to the first wall; and
       a bottom surface perpendicular to the first wall and the second wall;
    a lens positioned between the first wall and the second wall included in the fixing part, wherein a first gap is formed between the lens and the first wall, a second gap is formed between the lens and the second wall, and a third gap is formed between the lens and the bottom surface;
    a detector located on the base to receive an optical signal transmitted by the lens;
    a first fixing adhesive filled in the first gap and a second fixing adhesive filled in the second gap; and
    a third fixing adhesive filled in the third gap.

11. The optical module according to claim 10, wherein the fixing part comprises a U-shaped slot.

12. The optical module according to claim 10, wherein the fixing part comprises a square frame.

13. The optical module according to claim 10, wherein, an area of the first fixing adhesive is greater than an area of the third fixing adhesive.

14. The optical module according to claim 10, wherein strength of the first fixing adhesive is greater than strength of the third fixing adhesive.

15. The optical module according to claim 10, wherein, the bottom surface of the fixing part further comprises a groove configured to collect redundant of the third filled fixing adhesive.

16. The optical module according to claim 10, wherein, the first fixing adhesive and the second fixing adhesive are structural adhesive, and the third fixing adhesive is ultraviolet rays (UV) adhesive.

17. The optical module according to claim 10, wherein, a coefficient of expansion of the first fixing adhesive matches with a coefficient of expansion of the fixing part and a coefficient of expansion of the lens; and a coefficient of expansion of the second fixing adhesive matches with a coefficient of expansion of the fixing part and a coefficient of expansion of the lens.

18. The optical module according to claim 10, wherein, the third gap is in a range of 0.05 mm-0.15 mm; and the first gap and the second gap are respectively in a range of 0.025 mm-0.075 mm.

* * * * *